United States Patent
Toriyabe

(10) Patent No.: US 8,665,492 B2
(45) Date of Patent: Mar. 4, 2014

(54) IMAGE PROCESSING APPARATUS AND IMAGE PROCESSING METHOD THEREFOR

(75) Inventor: Hiroyuki Toriyabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 13/004,568

(22) Filed: Jan. 11, 2011

(65) Prior Publication Data

US 2011/0176155 A1 Jul. 21, 2011

(30) Foreign Application Priority Data

Jan. 18, 2010 (JP) .................................. 2010-008046

(51) Int. Cl.
*H04N 1/60* (2006.01)
*G03F 3/08* (2006.01)
*H04N 1/46* (2006.01)
*G06K 9/00* (2006.01)

(52) U.S. Cl.
USPC ............ 358/1.9; 358/518; 358/520; 358/525; 382/167; 382/165

(58) Field of Classification Search
USPC .......... 358/1.9, 518, 520, 523, 525, 504, 505, 358/530, 500; 382/162, 165, 167
See application file for complete search history.

(56) References Cited

U.S. PATENT DOCUMENTS

| | | | | |
|---|---|---|---|---|
| 5,856,876 | A * | 1/1999 | Sasanuma et al. | 358/300 |
| 6,184,915 | B1 * | 2/2001 | Atsumi et al. | 347/251 |
| 6,418,281 | B1 * | 7/2002 | Ohki | 399/49 |
| 6,879,416 | B2 * | 4/2005 | Shimizu | 358/520 |
| 6,999,199 | B2 | 2/2006 | Degani et al. | |
| 7,457,556 | B2 * | 11/2008 | Sekiguchi et al. | 399/53 |
| 8,179,576 | B2 * | 5/2012 | Hayashi | 358/520 |
| 8,294,947 | B2 * | 10/2012 | Yanagi | 358/1.9 |
| 8,305,664 | B2 | 11/2012 | Yasunaga | |
| 8,472,829 | B2 * | 6/2013 | Atsumi et al. | 399/74 |
| 8,488,188 | B2 * | 7/2013 | Nomura | 358/1.9 |
| 2005/0030562 | A1 * | 2/2005 | Hama et al. | 358/1.9 |
| 2005/0052666 | A1 * | 3/2005 | Yamamoto et al. | 358/1.9 |
| 2005/0094170 | A1 * | 5/2005 | Ichitani | 358/1.9 |
| 2005/0225784 | A1 | 10/2005 | Jacob et al. | |
| 2007/0019975 | A1 * | 1/2007 | Komiya | 399/49 |
| 2007/0195347 | A1 * | 8/2007 | Momose et al. | 358/1.9 |

(Continued)

FOREIGN PATENT DOCUMENTS

| | | |
|---|---|---|
| CN | 101592895 A | 12/2009 |
| JP | 2004-289368 A | 10/2004 |
| JP | 2007-3781 | 1/2007 |
| JP | 2008-26551 | 2/2008 |

OTHER PUBLICATIONS

Chinese Office Action dated May 31, 2013 in Chinese Appl No. 201110022676.7, with English translation.

*Primary Examiner* — Madelein A Nguyen
(74) *Attorney, Agent, or Firm* — Fitzpatrick, Cella, Harper & Scinto

(57) ABSTRACT

The present invention relates to an image processing apparatus which performs density tone correction with high accuracy while reducing the burden on the user. The image processing apparatus prints an evaluation image in which a plurality of color patches and a plurality of reference patches are placed on the same main scanning line, measures density of the printed evaluation image, performs density irregularity correction in a main scanning direction using densities of the measured reference patches, and performs density tone correction using densities of the measured color patches. Results of the density irregularity correction are reflected in the density tone correction.

7 Claims, 15 Drawing Sheets

(56) References Cited

U.S. PATENT DOCUMENTS

| | | |
|---|---|---|
| 2009/0002784 A1* | 1/2009 | Morikawa .................... 358/520 |
| 2009/0060538 A1* | 3/2009 | Higuchi et al. ................ 399/39 |
| 2009/0067860 A1* | 3/2009 | Sakai et al. .................... 399/49 |
| 2010/0149567 A1* | 6/2010 | Kanazawa et al. ............ 358/1.9 |
| 2010/0271673 A1* | 10/2010 | Ohkawa ........................ 358/518 |
| 2011/0128599 A1* | 6/2011 | Watanabe ..................... 358/518 |
| 2011/0222870 A1* | 9/2011 | Miyagi .......................... 399/15 |
| 2012/0154826 A1* | 6/2012 | Yamazaki ..................... 358/1.1 |
| 2012/0155898 A1* | 6/2012 | Okada ............................ 399/49 |
| 2012/0243897 A1* | 9/2012 | Atsumi et al. ................. 399/74 |
| 2013/0011153 A1* | 1/2013 | Toriyabe ........................ 399/49 |

* cited by examiner

FIG. 14

COLOR PATCH DENSITY VARIATION ESTIMATION TABLE (FOR 80% MAGENTA PATCHES)

| | | AMOUNT OF LASER INTENSITY CORRECTION | | | | | |
|---|---|---|---|---|---|---|---|
| | | ... | −2 | −1 | 0 | +1 | +2 | ... |
| | ... | | | | | | | |
| | 1.20 | | $F_{m80}(-2, 1.20)$ | $F_{m80}(-1, 1.20)$ | $F_{m80}(0, 1.20)$ | $F_{m80}(+1, 1.20)$ | $F_{m80}(+2, 1.20)$ | ... |
| | 1.10 | | $F_{m80}(-2, 1.10)$ | $F_{m80}(-1, 1.10)$ | $F_{m80}(0, 1.10)$ | $F_{m80}(+1, 1.10)$ | $F_{m80}(+2, 1.10)$ | ... |
| MEASURED DENSITY VALUE | 1.00 | | $F_{m80}(-2, 1.00)$ | $F_{m80}(-1, 1.00)$ | $F_{m80}(0, 1.00)$ | $F_{m80}(+1, 1.00)$ | $F_{m80}(+2, 1.00)$ | ... |
| | 0.90 | | $F_{m80}(-2, 0.90)$ | $F_{m80}(-1, 0.90)$ | $F_{m80}(0, 0.90)$ | $F_{m80}(+1, 0.90)$ | $F_{m80}(+2, 0.90)$ | ... |
| | 0.80 | | $F_{m80}(-2, 0.80)$ | $F_{m80}(-1, 0.80)$ | $F_{m80}(0, 0.80)$ | $F_{m80}(+1, 0.80)$ | $F_{m80}(+2, 0.80)$ | ... |
| | ... | | | | | | | |

IMAGE PROCESSING APPARATUS AND IMAGE PROCESSING METHOD THEREFOR

BACKGROUND OF THE INVENTION

1. Field of the Invention

The present invention relates to an image processing apparatus which performs density tone correction with high accuracy while reducing the burden on the user.

2. Description of the Related Art

An image forming apparatus which uses electrophotography forms images by scanning a photosensitive body with laser light. An electrophotographic print engine first irradiates a photosensitive drum with an image signal based on laser light emitted from an exposure unit. Then, an electrostatic latent image formed on the photosensitive drum is developed by toner. A resulting toner image is transferred to a print medium such as paper and thermally fused by a fixing unit, thereby forming an image on the print medium.

With such an image forming apparatus, printed output images may change in color tones due to changes in operating environment such as temperature and humidity, aging of the apparatus, performance degradation of materials and components with long-term use, and the like. Density tone correction is performed to ensure stable output by reducing such color tone changes.

A typical density tone correction process involves laying out test color patches on a print medium to prepare a test page, printing the test page, and measuring the color patches using a densitometer or colorimeter. Then, a correction table is created based on measurement results and on target data prepared in advance. When a print job is received from a host computer, data correction is performed using the correction table during RIP or subsequent processes and results are reflected in final printing on a print engine.

However, there is a problem in that a density tone correction process cannot be performed with high accuracy unless impacts of density irregularities and color irregularities on a page surface during printing are taken into consideration in creating the correction table. Generally, impacts of such irregularities show up more greatly in a main scanning direction than in a sub-scanning direction.

Causes of the density irregularities and color irregularities in the main scanning direction include sensitivity irregularities of the photosensitive body in the main scanning direction, loss of laser intensity near ends of the photosensitive drum, and lens aberration. Consequently, even if the photosensitive body is exposed to uniform energy, density irregularities and color irregularities can occur depending on the location of the image on transfer paper. To reduce the density irregularities and color irregularities, density irregularity correction in the main scanning direction is carried out.

The density irregularity correction in the main scanning direction provides a function to divide an image recognition range in the main scanning direction into multiple blocks, lay out reference patches for measurement on the blocks thereby preparing a test page, print the test page, and adjust the laser intensity so as to eliminate density differences in each block based on results of density measurements of the reference patches on each block.

To adjust image quality in this way, generally adjustments are made to reduce density irregularities and color irregularities by density irregularity correction in the main scanning direction, and then density tone correction is performed to ensure stable output by reducing color tone changes.

As described above, for each correction function, a test chart unique to the correction function is printed. That is, the user needs to print the test chart and measure the patches printed on the test chart for density irregularity correction in the main scanning direction, and then print the test chart and measure the patches printed on the test chart again for density tone correction. This is not desirable in terms of user convenience.

Furthermore, since a test page for density irregularity correction in the main scanning direction and a test page for density tone correction are printed separately, differences will arise in printing conditions of the image forming apparatus. That is, in a strict sense, it cannot be said that the density irregularity correction in the main scanning direction is reflected accurately in the density tone correction.

Profile Creation

On an image printing device such as a printer, to print with accurate colors, color conversion is performed using a printer profile. A LUT (lookup table) is used in the printer profile to convert data from a device-independent color space (such as a CIE-LAB space) into a device (printer in this case) dependent color space (such as a CMYK or RGB space).

The LUT does not hold conversion values for all color data in the input color space, but contains conversion values for representative points in the input color space. For example, if the input color space is m-dimensional and n grids are set for each channel, the LUT contains n to the mth power items of grid point data. Regarding such items of input color space data that are off the grid points, interpolative calculation is performed using values of grid point data around the items of the input color space data, and output color space data corresponding to the input color space data is created.

When creating a color profile using profile creation software, the user prints a test page on which color patches for profile creation have been laid out, measures the color patches printed on the test page, and creates the color profile based on the measured values. In printing the test page for profile creation, again the density irregularity correction process in the main scanning direction and density tone correction process are performed. Again, separate test pages are printed for density irregularities in the main scanning direction and gray scale, increasing the burden on the user because measurement processing is necessary each time, and reducing accuracy due to a shift in print timing between the test pages.

To solve these problems, techniques have been proposed which print reference patches for density irregularity correction in the main scanning direction and color patches for density tone correction on the same evaluation image and thereby reflect measurement results of the reference patches in the density tone correction.

For example, it is stated in Japanese Patent Application Laid-Open No. 2008-026551 that unevenness of development in the main scanning direction can be corrected by forming multiple reference patches of the same density in the main scanning direction in locations different from a color patch area on the same test chart. It is also stated that by applying the result of correcting the unevenness of development in the main scanning direction to density tone correction, the density tone correction can be performed with higher accuracy.

Also, Japanese Patent Application Laid-Open No. 2007-3781 proposes a technique which has a color patch area for density tone correction and two or more reference patch areas on an evaluation image, the reference patch areas containing reference colors different from the color patches and being located in the sub-scanning direction. Based on measured density values of the reference patch areas, the technique predicts density variation in the sub-scanning direction, corrects measured density values of the color patches, and thereby improves accuracy of density tone correction.

However, according to Japanese Patent Application Laid-Open No. 2008-026551, the reference patches for density irregularity correction in the main scanning direction are displaced in the sub-scanning direction from the color patches for density tone correction. In this case, tendencies of density irregularities in the main scanning direction may differ when compared between the locations of the two types of patches in the sub-scanning direction. Consequently, values of density irregularities in the main scanning direction cannot be reflected accurately in the density tone correction. Since the reference patches and color patches are placed in different rows, the number of times the user manually measures patch density using a densitometer is not much different from when the two correction processes are performed separately.

On the other hand, according to Japanese Patent Application Laid-Open No. 2007-3781, two or more reference patch areas of the same process color for density irregularity correction in the main scanning direction are provided in the sub-scanning direction. That is, all color patches of the same process color, including color patches for density tone correction and reference patches for density irregularity correction in the main scanning direction, are not placed on one line. Consequently, measurement of one line per process color is not sufficient for measurement of densities of color patches and reference patches.

SUMMARY OF THE INVENTION

The present invention has been made in view of the above problems and has an object to provide an image processing apparatus which enables high-accuracy density tone correction and profile creation while reducing the burden on the user.

In order to achieve the object discussed above, the present invention provides an image processing apparatus comprising a printing unit that prints an evaluation image in which a plurality of color patches and a plurality of reference patches are placed on a same main scanning line, a measuring unit that measures density of the evaluation image printed by the printing unit, a density irregularity correction unit that performs density irregularity correction in a main scanning direction using densities of the plurality of reference patches measured by the measuring unit, and a density tone correction unit that performs density tone correction using densities of the plurality of color patches measured by the measuring unit, wherein the density tone correction unit causes the correction performed by the density irregularity correction unit to be reflected in the density tone correction.

Further features of the present invention will become apparent from the following description of exemplary embodiments with reference to the attached drawings.

BRIEF DESCRIPTION OF THE DRAWINGS

FIG. 14 is a diagram showing an example of a color patch density variation estimation table.

DESCRIPTION OF THE EMBODIMENTS

Preferred embodiments of the present invention will now be described in detail in accordance with the accompanying drawings.

<Configuration of Image Processing Apparatus>

Figure 1:
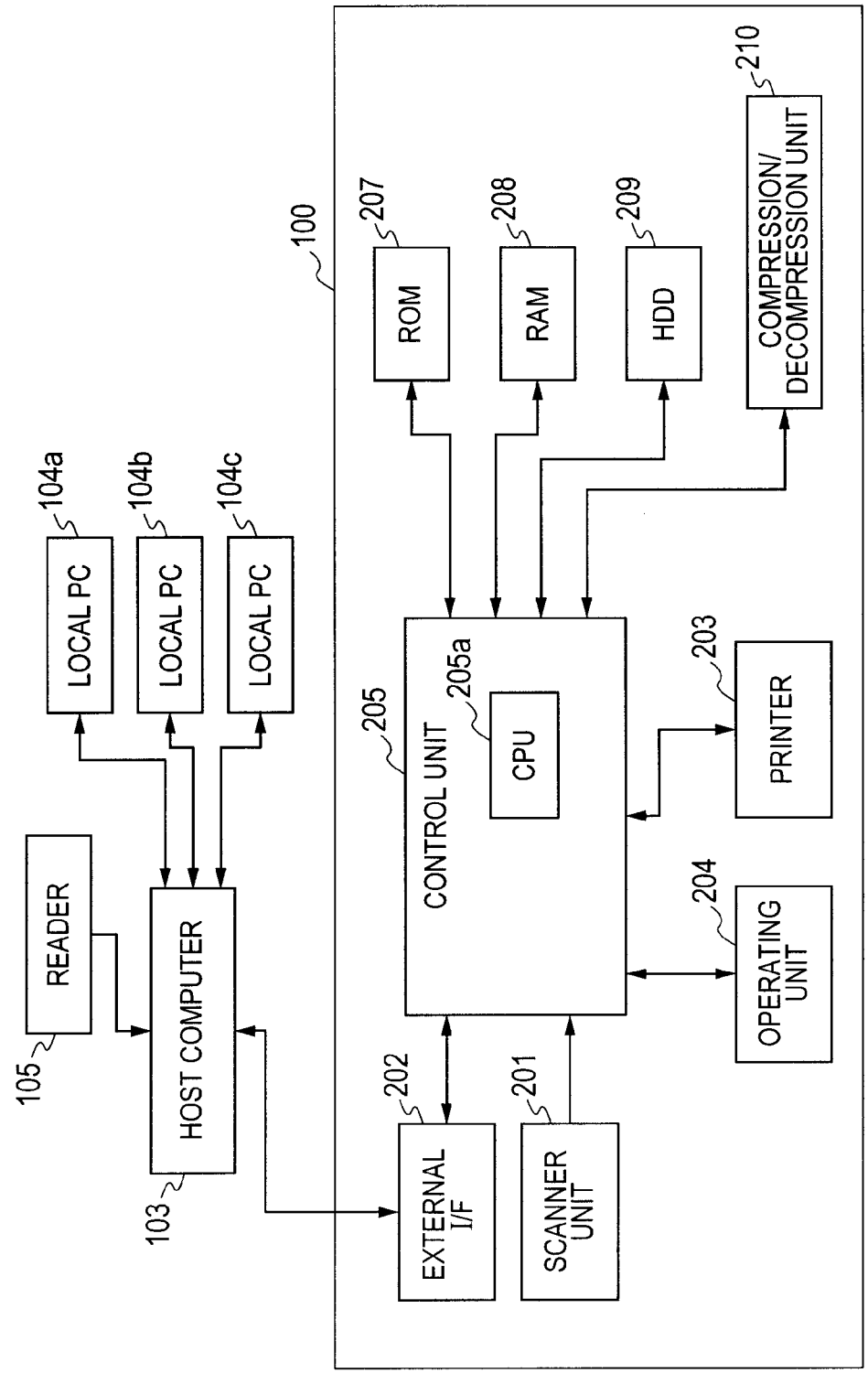
FIG. 1 is a block diagram illustrating a configuration of an image processing apparatus according to an exemplary embodiment of the present invention.

FIG. 1 is a block diagram illustrating a configuration of an image processing apparatus 1000 according to an exemplary embodiment of the present invention.

The image processing apparatus 1000 includes a printing device 100, host computer 103, local PC 104, and reader 105. Incidentally, in the following description, a multi function peripheral (MFP) which has multiple functions such as copying function and printing function will be used as an example of the printing device 100. However, the printing device 100 may be a single-function printing device (printer) which has only a copying function or printing function. Incidentally, among various units included in the image processing apparatus 1000, units other than the host computer 103, local PC 104, and reader 105 are included in the printing device 100. However, printing can be done by connecting the local PC 104 to the printing device 100 without involving the host computer 103. The reader 105 serves the function of a densitometer which measures density of color materials on a printing medium. The reader 105 can be connected not only to the host computer 103, but also to the printing device 100 and local PC 104.

Figure 2:
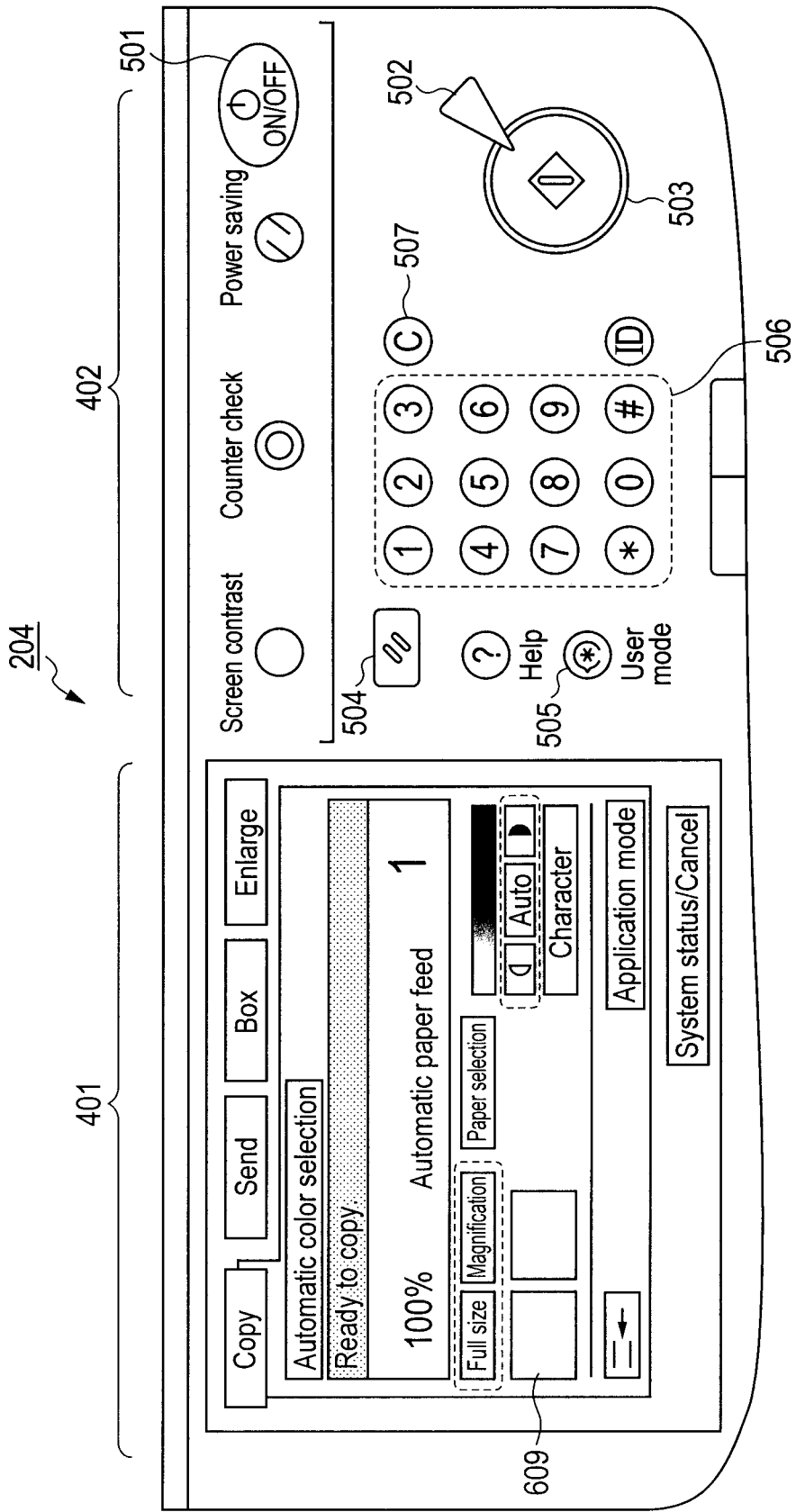
FIG. 2 is an external view showing an operating unit of a printing device used for the image processing apparatus shown in FIG. 1.

The host computer 103 and local PC 104 are capable of communicating with the printing device 100. A scanner unit 201 reads an image on an original, converts the image into image data, and transfers the image data to other units. An external I/F 202 exchanges data with other devices connected to a network. A printer 203 prints images on sheets based on inputted image data. An operating unit 204 includes a hard key input unit (key input unit) 402 (FIG. 2) and touch panel unit 401 (FIG. 2) described later and accepts commands from a user via the hard key input unit 402 or touch panel unit 401. Also, the operating unit 204 displays various information on the touch panel of the operating unit 204.

A control unit 205 includes a CPU 205a and exerts overall control over various units and processes of the printing device 100. A ROM 207 stores various computer programs executed by the CPU 205a. For example, the ROM 207 stores programs needed to make the control unit 205 perform various processes of flowcharts described later as well as a display control program needed to display various setting screens. Also, the ROM 207 stores a program in order for the control unit 205 to interpret PDL (Page Description Language) code data received from the host computer 103, local PC 104, and the like and translate the PDL code data into raster image data. Besides, the ROM 207 stores a boot sequence, font information, and the like. A RAM 208 stores image data received from the scanner unit 201 and external I/F 202 as well as various programs and setting information loaded from the ROM 207. Incidentally, data is written into or read out of the RAM 208 under the control of the CPU 205a.

An HDD (hard disk drive) 209 includes a hard disk and a drive unit adapted to read and write data from/into the hard disk. The HDD 209 used as a storage is a high-capacity storage device adapted to store image data received from the scanner unit 201 or external I/F 202 and compressed by a compression/decompression unit 210. Also, the HDD 209 stores memory settings (recommended settings) of various items described later. At the direction of the user, the control unit 205 causes image data (print data) stored in the HDD 209 to be printed on the printer 203. Also, the control unit 205 can transmit image data stored in the HDD 209 to external devices such as the host computer 103 via the external I/F 202 at the direction of the user. The compression/decompression unit 210 compresses/decompresses image data stored in the RAM 208 or HDD 209 in JBIG, JPEG, or other format.

First Embodiment

Figure 3:
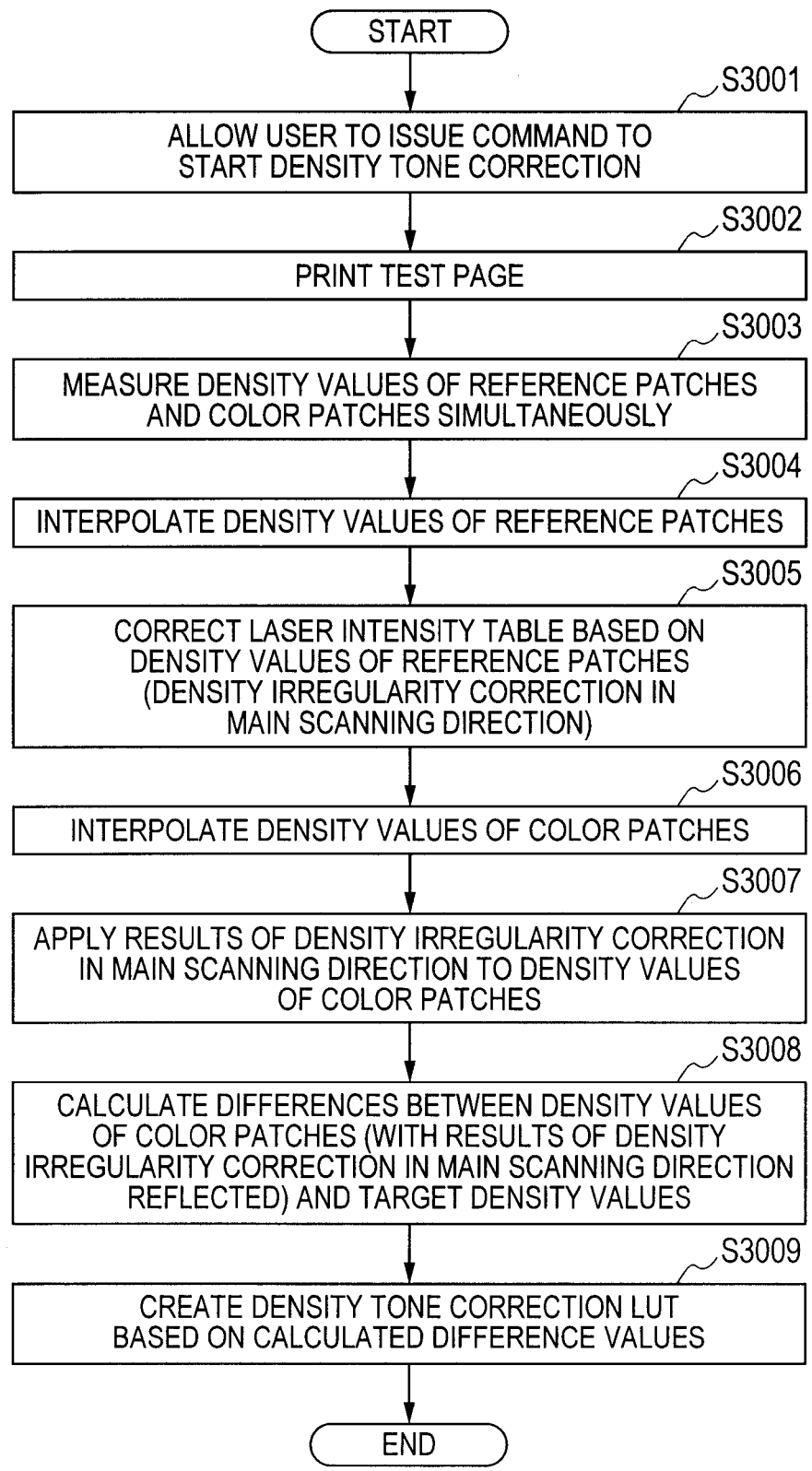
FIG. 3 is a flowchart showing a density tone correction process which takes into consideration effects of density irregularity correction in a main scanning direction, according to a first embodiment.

Next, a process flow of an image processing apparatus according to a first embodiment will be described in detail with reference to a flowchart in FIG. 3 and an exemplary evaluation image in FIG. 4.

First, the user starts density tone correction software pre-installed on the host computer 103. Then, the user issues a command to perform density tone correction using a density tone correction command screen 10000 (FIG. 10) displayed on the computer 103 (S3001). To give a command to perform density tone correction, the user can press a "Yes" button 10001 first, and then press a "Density Irregularity Correction" button 10002. Although the user is allowed to select between Normal mode and Density Irregularity Correction mode in FIG. 10, this is not restrictive, and only the Density Irregularity Correction mode may be displayed. In response to the command, the printer 203 of the printing device 100 prints an evaluation image 4000 (S3002).

Figure 4:
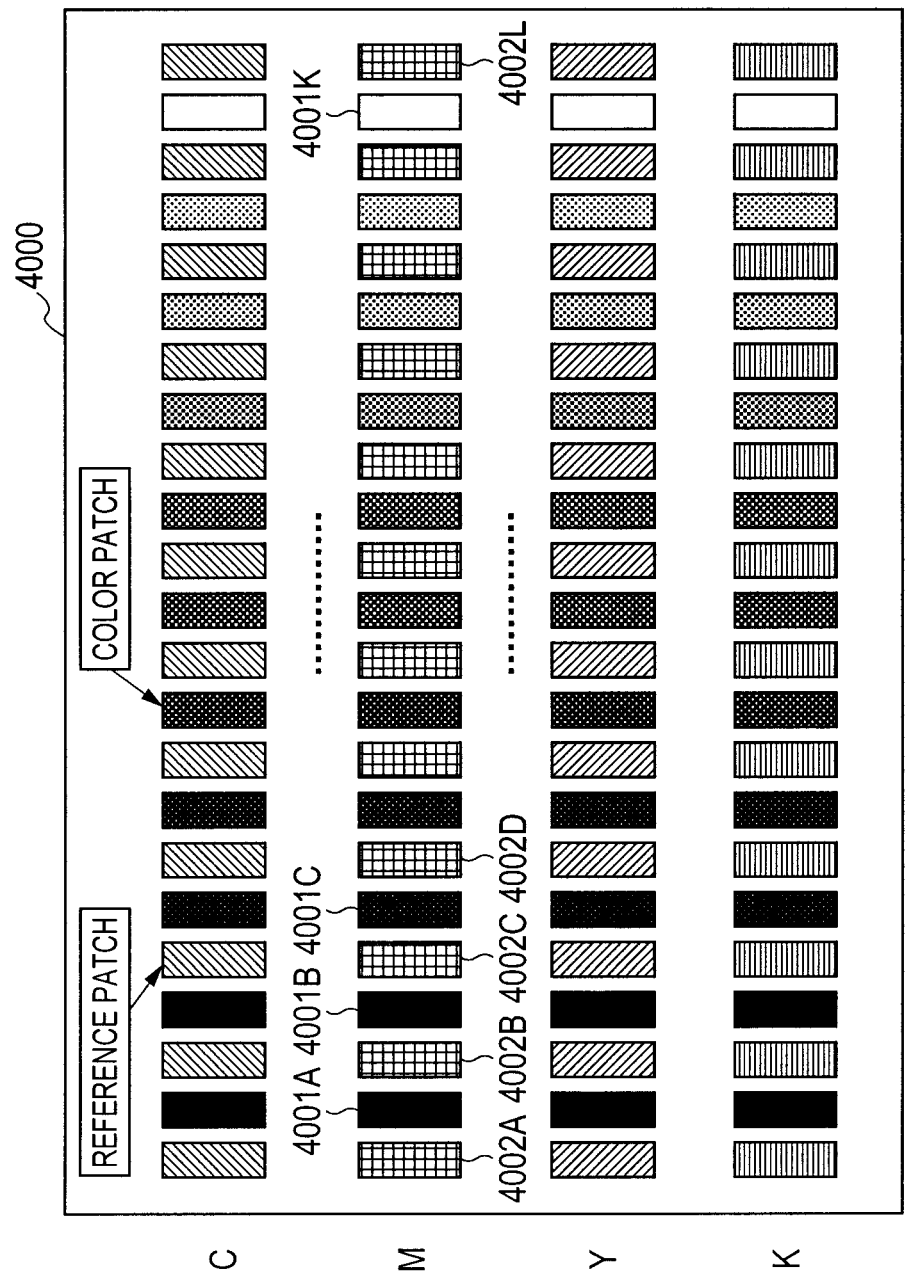
FIG. 4 is a diagram showing an example of an evaluation image used in the first embodiment.

As shown in FIG. 4, multiple color patches and multiple reference patches are placed alternately on the same main scanning line of the evaluation image 4000, where all the patches have the same process color (one of cyan C, magenta M, yellow Y, and black K). The multiple color patches are identical in process color, but different in density. For example, magenta patches of 100%, 90%, 0% densities are placed in 4001A to 4001K in FIG. 4. Also, the multiple reference patches have the same process color as the color patches and have identical density. For example, magenta reference patches of 50% density are placed in 4002A to 4002L in FIG. 4. Incidentally, although the density of the reference patches is set at 50% for simplicity of description, this is not restrictive. The density may be set to a value which will more readily reflect the density irregularities of the printing device 100.

Next, the user measures the printed evaluation image 4000 by following instructions on a UI of the density tone correction software and using the reader 105 connected to the host computer 103 (S3003).

Figure 11:
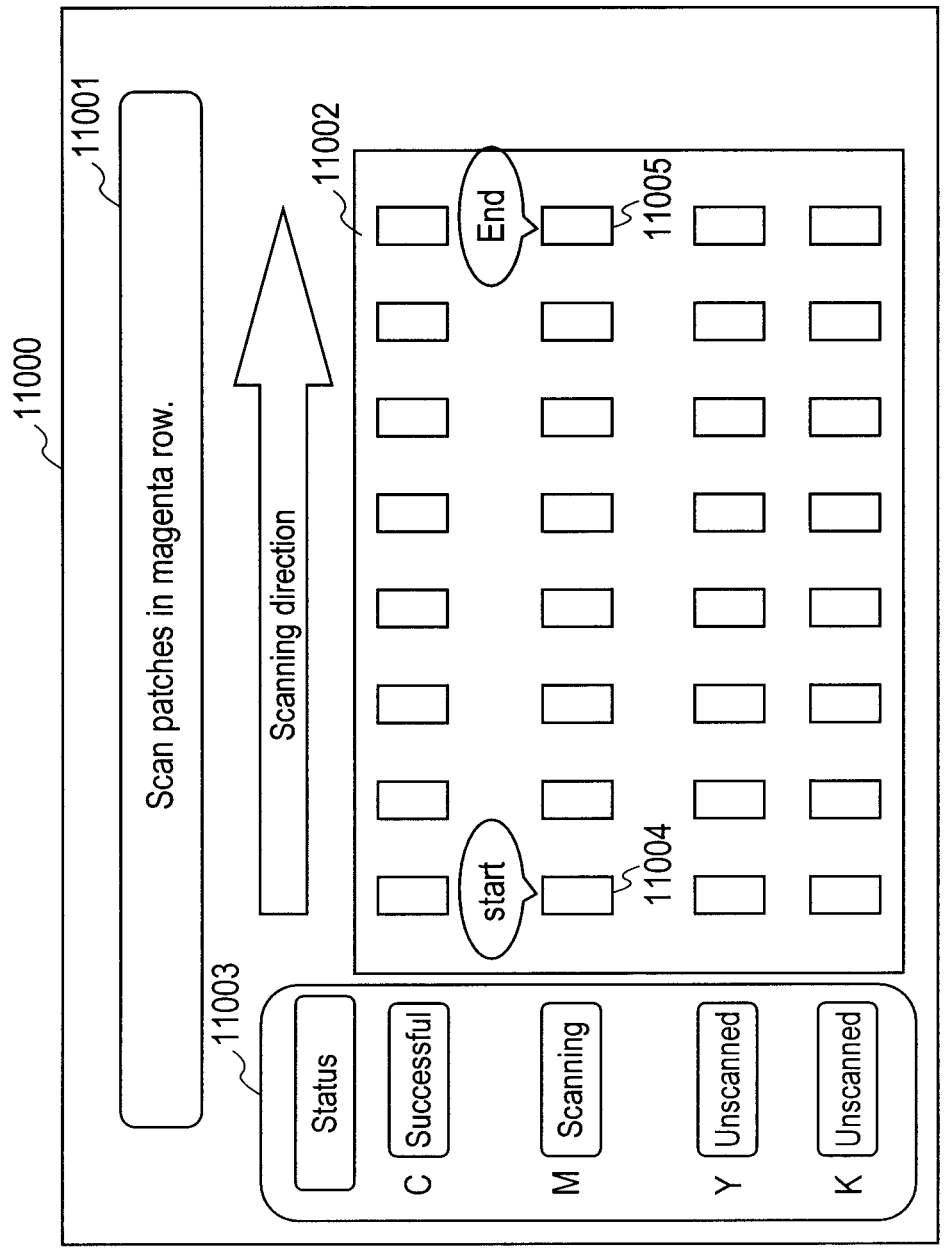
FIG. 11 is a diagram showing an example of a UI displayed during measurement of an evaluation image.

FIG. 11 shows an example of an evaluation image measurement UI screen displayed on the computer 103 when the evaluation image 4000 is measured using the reader 105. The evaluation image measurement UI screen 11000 includes a prompt display section 11001, evaluation image summary display section 11002, and measurement status display section 11003. The prompt display section 11001 displays operating instructions to the user as required. The evaluation image summary display section 11002 displays a summary of the evaluation image to the user, allowing the user to intuitively understand details of a measurement method including orientation of an evaluation sheet and direction of measurement. The measurement status display section 11003 displays scanning status of each row including success/failure, completion/incompletion, and the like. For example, when measuring the patches in a magenta row in FIG. 11, the user specifies a start patch 11004 and end patch 11005 of patches to be read by the reader 105.

Read data obtained by measurement is transmitted from the host computer 103 to the control unit 205 of the image processing apparatus 1000. The control unit 205 processes the received read data as follows.

First, assuming that patches (virtual reference patches) exist at locations where actually no reference patch is placed, the control unit 205 estimates density values at the locations by interpolation (S3004). Regarding the interpolation, the density values of the virtual reference patches may be found by linear interpolation using density values of known reference patches in the vicinity or may be found using another interpolation technique. A location at which 80%-density magenta color patch 4001C shown in FIG. 4 is placed will be described as an example. Assuming that a reference patch exists at the same location as the color patch, the density value of the virtual reference patch is calculated from density values of adjacent two reference patches 4002C and 4002D in the main scanning direction. For example, when linear interpolation is used, an average value of the density values of the patches 4002C and 4002D provides the density value of the virtual reference patch.

Figure 12:
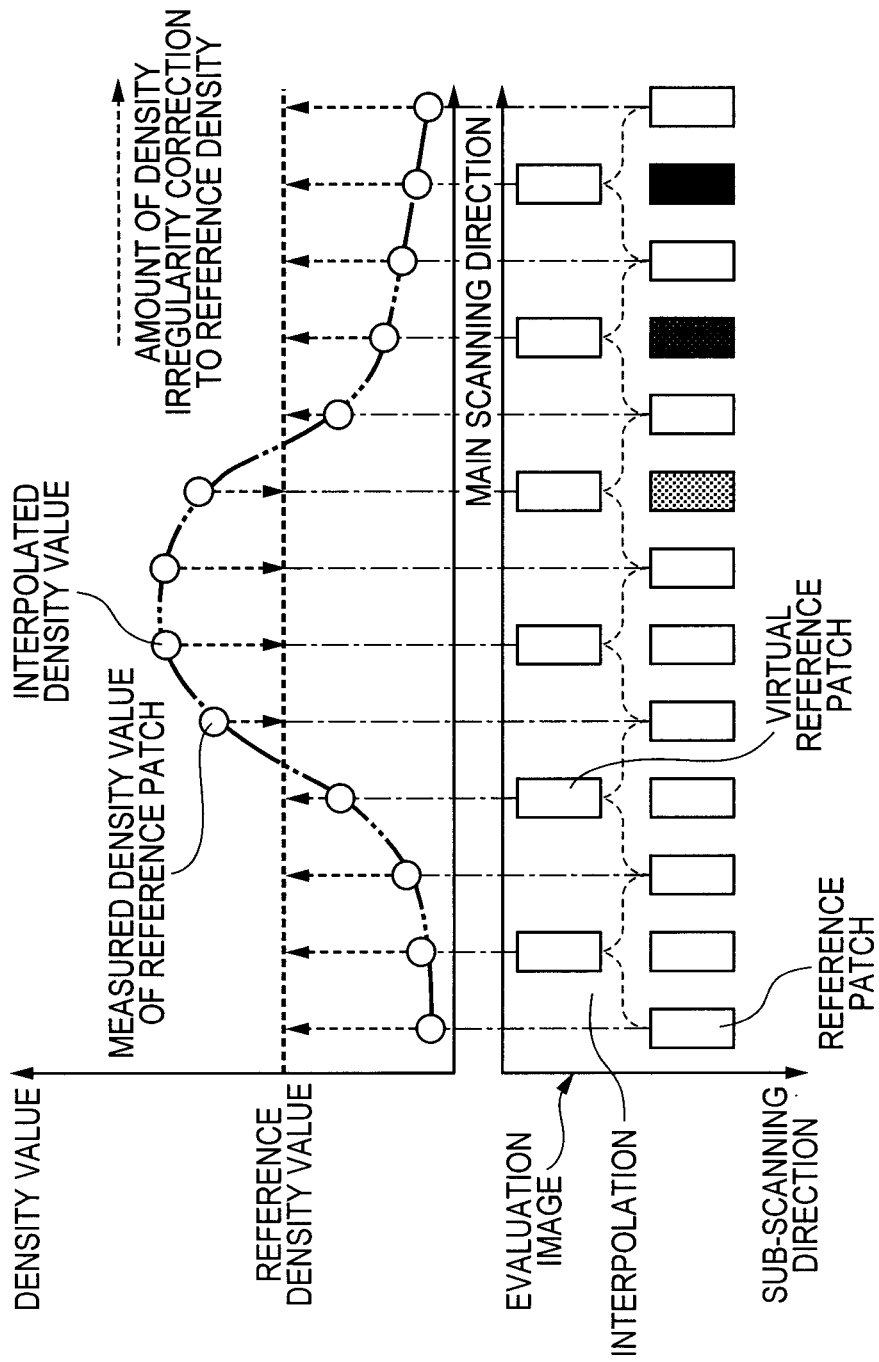
FIG. 12 is a diagram showing an example of density irregularity correction.
Figure 13:
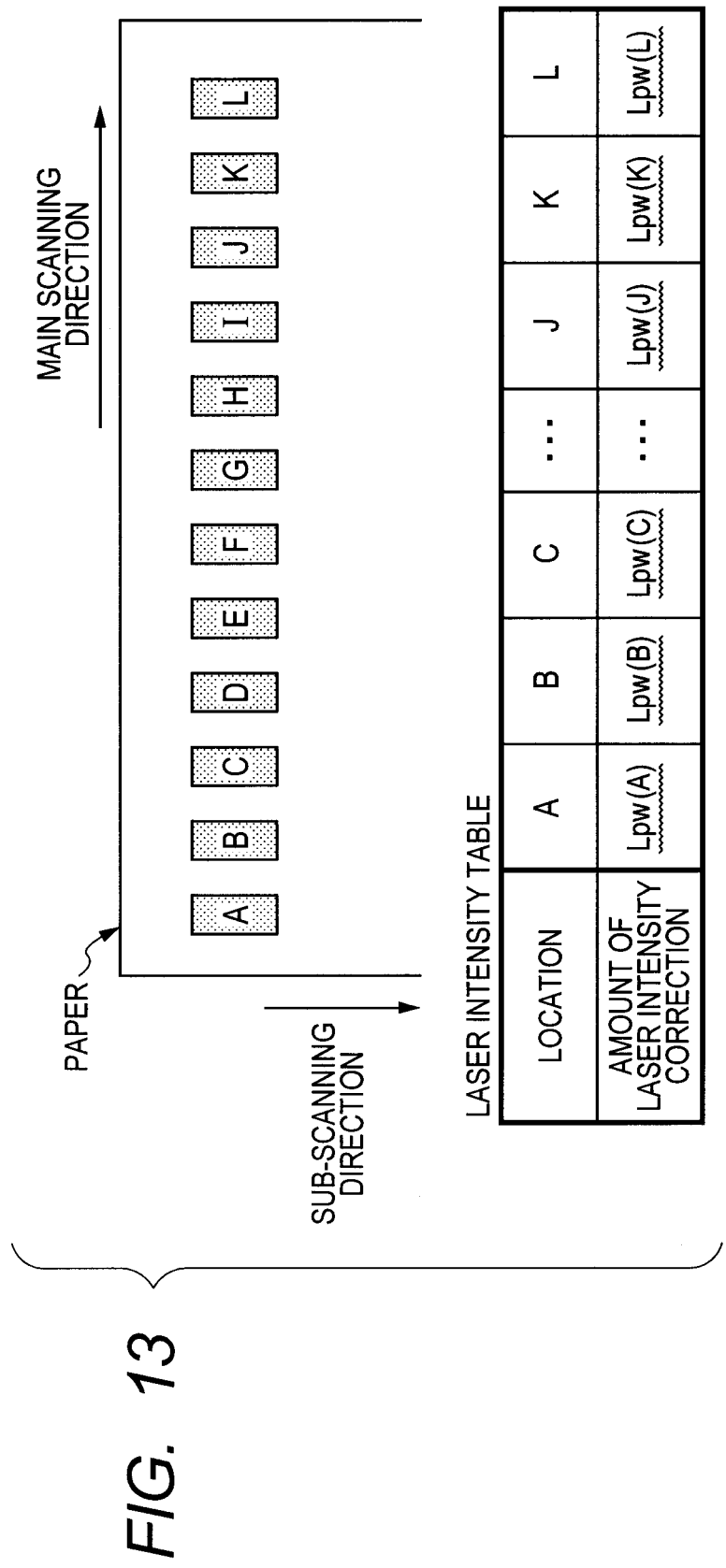
FIG. 13 is a diagram showing an example of a laser intensity table.

Based on measured density values and interpolated density values of all the reference patches, the control unit 205 performs density irregularity correction in the main scanning direction (S3005). The interpolation is performed as follows. As shown in FIG. 12, the control unit 205 finds differences of the measured density values of the reference patches and density values (interpolated density values) of the virtual reference patches thus acquired, from reference density values set in advance for the reference patches, and designates the differences as amounts of density irregularity correction. As shown in FIG. 13, the amounts of density irregularity correction at predetermined locations A to L in the main scanning direction are stored as amounts of laser intensity correction Lpw(A) and Lpw(L) in a laser intensity table.

Next, assuming that patches (virtual color patches) exist at locations where actually no color patch is placed, the control unit 205 estimates density values of the virtual color patches by interpolation (S3006). Regarding the interpolation, the density values of the virtual color patches may be found by linear interpolation using density values of known color patches in the vicinity or may be found using other interpolation techniques.

Next, the control unit 205 finds density variations by applying effects of the density irregularity correction in the main scanning direction to measured density values and interpolated density values of the color patches (S3007). The density variations are values which give estimates of how much the density values of color patches will change as a result of the density irregularity correction in the main scanning direction. The density variations are estimated using the amounts of laser intensity correction resulting from density irregularity correction, the measured density values of the color patches, and a color patch density variation estimation table already held by the image processing apparatus 1000.

The color patch density variation estimation table holds representative values of color patch density variations in relation to specific measured density values and amounts of laser intensity correction by classifying the color patch density variations by process color and color patch target density. FIG. 14 shows an example of a color patch density variation estimation table in which the process color is magenta and color patch target density is 80%. In the table, Fm80 (x, y) represents the density variation of an 80% magenta patch when the amount of laser intensity correction is x and the density value of the color patch is y. For example, when the amount of laser intensity correction is +2 and the density value of the color patch is 1.20, the density variation of the 80% magenta patch is Fm80(+2, 1.20).

As an example, the 80% magenta color patch 4001C in FIG. 4 will be described.

The density of a reference patch assumed to be placed at the same location as the 80% magenta color patch is calculated in the manner described above, density irregularity correction is performed, and the amount of laser intensity correction thus determined is assumed to be at a "+2 level." Also, it is assumed that the measured density value of the 80% magenta color patch is 1.05. Here, the control unit 205 uses the color patch density variation estimation table described above. The color patch density variation estimation table holds density variations of a 80% magenta color patch for an amount of laser intensity correction at "+2 level", including Fm80 (+2, 1.00) as the density variation at a measured density value of 1.00 and Fm80 (+2, 1.10) as the density variation at a measured density value of 1.10. Based on the two representative values, the control unit 205 finds the density variation Fm80 (+2, 1.05) at a measured density value of 1.05 by linear interpolation.

Figure 15:
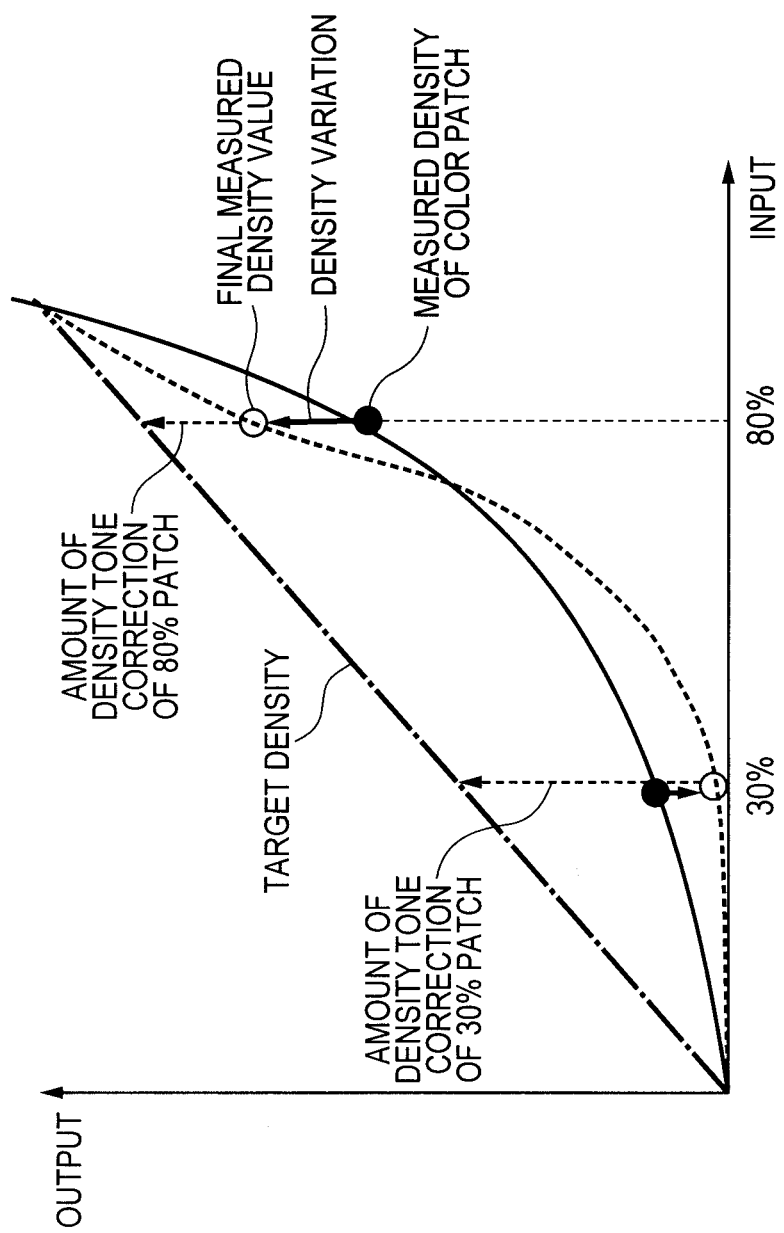
FIG. 15 is a diagram showing an example of density tone correction.

As shown in FIG. 15, the control unit 205 establishes final measured density values by adding the density variations determined in the manner described above to the measured density values of the color patches. Also, the control unit 205 calculates differences between the final measured density values and predetermined target density values (S3008) and establishes the differences as amounts of density tone correction (FIG. 15). Finally, the control unit 205 creates a density tone correction table (density tone correction LUT) based on the amounts of density tone correction determined above (S3009). The control unit 205 applies the created density tone correction table to subsequent print jobs. Incidentally, the print jobs involve the image data received from the scanner unit 201 or image data obtained by rendering jobs which have been described in PDL (Page Description Language) and have been received from the local PC 104 or host computer 103. The created density tone correction table is applied to the image data.

Second Embodiment

Figure 5:
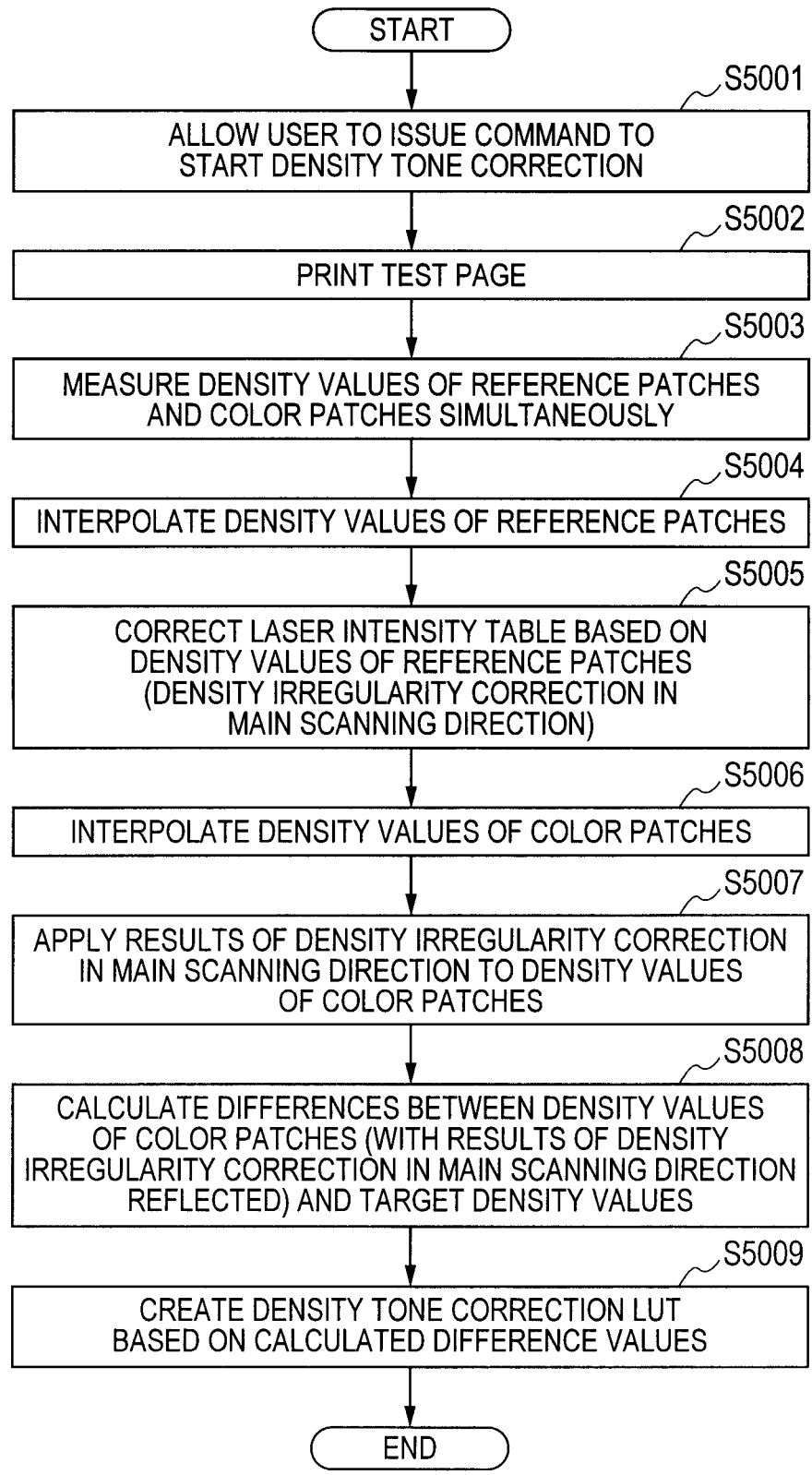
FIG. 5 is a flowchart showing a density tone correction process which takes into consideration effects of density irregularity correction in a sub-scanning direction as well as in the main scanning direction, according to a second embodiment.

Next, a process flow of an image processing apparatus according to a second embodiment will be described in detail with reference to a flowchart in FIG. 5 and an exemplary evaluation image in FIG. 6. In the second embodiment, density irregularity correction can be performed by taking into consideration density irregularities in a sub-scanning direction in addition to density irregularities in the main scanning direction.

Figure 6:
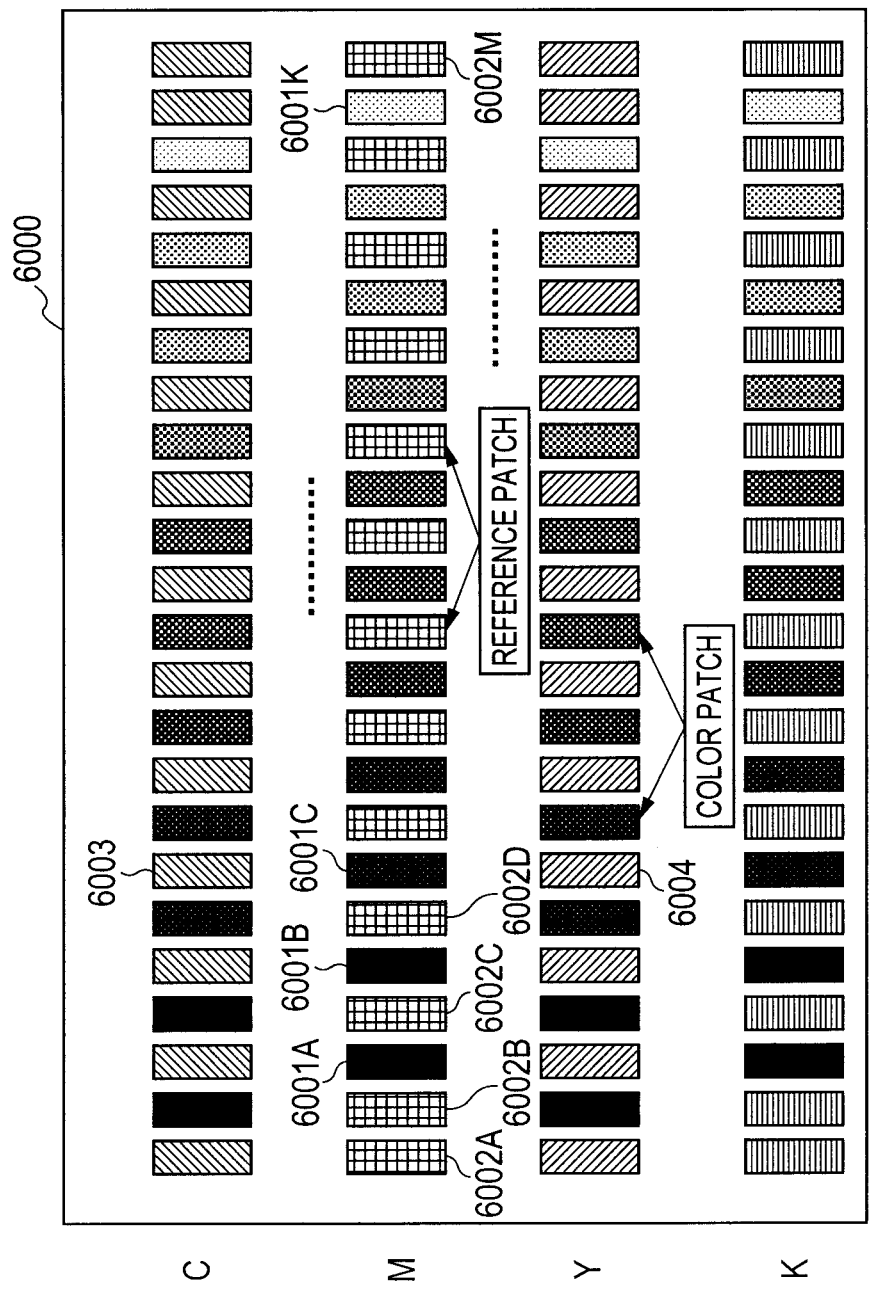
FIG. 6 is a diagram showing an example of an evaluation image used in the second embodiment.

As shown in FIG. 6, multiple color patches and multiple reference patches except some peripheral patches are placed alternately on the same main scanning line of an evaluation image 6000, where all the patches have the same process color (one of cyan C, magenta M, yellow Y, and black K). Also, when compared between adjacent process colors in the sub-scanning direction, multiple color patches and multiple reference patches are placed in such a way as to alternate each other in the sub-scanning direction. The multiple color patches are identical in process color, but different in density. For example, magenta patches of 100%, 90%, . . . , 0% densities are placed in 6001A to 6001K in FIG. 6. Also, the multiple reference patches have the same process color as the color patches and have identical density. For example, magenta reference patches of 50% density are placed in 6002A to 6002M in FIG. 6. Incidentally, although the density of the reference patches is set at 50% for simplicity of description, this is not restrictive. The density may be set to a value which will more readily reflect the density irregularities of the printing device 100.

The processes of S5001 to S5006 are the same as the first embodiment, and thus detailed description thereof will be omitted.

In S5007, the control unit 205 finds density variations by applying effects of the density irregularity correction in the main scanning direction to measured density values and interpolated density values of the color patches. As in the case of the first embodiment, the density variations are estimated using the amounts of laser intensity correction (FIG. 13) resulting from density irregularity correction, the measured density values of the color patches, and the color patch density variation estimation table (FIG. 14) already held by the image processing apparatus 1000.

As an example, the 80% magenta color patch (6001C) in FIG. 6 will be described.

The density of a reference patch assumed to be placed at the same location as the 80% magenta color patch is calculated in the manner described above, density irregularity correction is performed, and the amount of laser intensity correction thus calculated is assumed to be at a "+2 level." Also, it is assumed that the measured density value of the 80% magenta color patch is 1.05. Here, the control unit 205 uses the color patch density variation estimation table described above. The color patch density variation estimation table holds density variations of a 80% magenta color patch for an amount of laser intensity correction at "+2 level", including Fm80 (+2, 1.00) as the density variation at a measured density value of 1.00 and Fm80 (+2, 1.10) as the density variation at a measured density value of 1.10. Based on the two representative values, the control unit 205 finds the density variation Fm80 (+2, 1.05) at a measured density value of 1.05 by linear interpolation.

Furthermore, the control unit 205 calculates density variations by referring to the amounts of laser intensity correction at locations (cyan and yellow in this case) adjacent to the target color patch (magenta in this case) in the sub-scanning direction.

First, if the amount of laser intensity correction is at "+0 level" at a location 6003 adjacent on one side in the sub-scanning direction, the control unit 205 calculates the density variation Fm80 (+0, 1.05) of a 80% magenta color patch for an amount of laser intensity correction at "+0 level."

Next, if the amount of laser intensity correction is at "+1 level" at a location 6004 adjacent on the other side in the sub-scanning direction, the control unit 205 calculates the density variation Fm80 (+1, 1.05) of a 80% magenta color patch for an amount of laser intensity correction at "+1 level."

The control unit 205 calculates the final density variation by averaging, for example, the values Fm80(+2, 1.05), Fm80 (+0, 1.05), and Fm80(+1, 1.05) calculated as described above. Incidentally, the final density variation may be determined by a method other than the one which simply averages the values. For example, the values may be averaged after being assigned different weights depending on the process colors adjacent in the sub-scanning direction.

As shown in FIG. 15, the control unit 205 establishes final measured density values by adding the density variations determined in the manner described above to the measured density values of the color patches. Also, the control unit 205 calculates differences between the final measured density values and predetermined target density values (S5008) and establishes the differences as amounts of density tone correction (FIG. 15). Finally, the control unit 205 creates a density tone correction table (density tone correction LUT) based on the amount of density tone correction determined above (S5009). The control unit 205 applies the created density tone correction table to subsequent print jobs. The created density tone correction table is applied to the image data.

Incidentally, the print jobs involve the image data received from the scanner unit 201 or image data obtained by rendering jobs which have been described in PDL (Page Description Language) and have been received from the local PC 104 or host computer 103.

Third Embodiment

Figure 7:
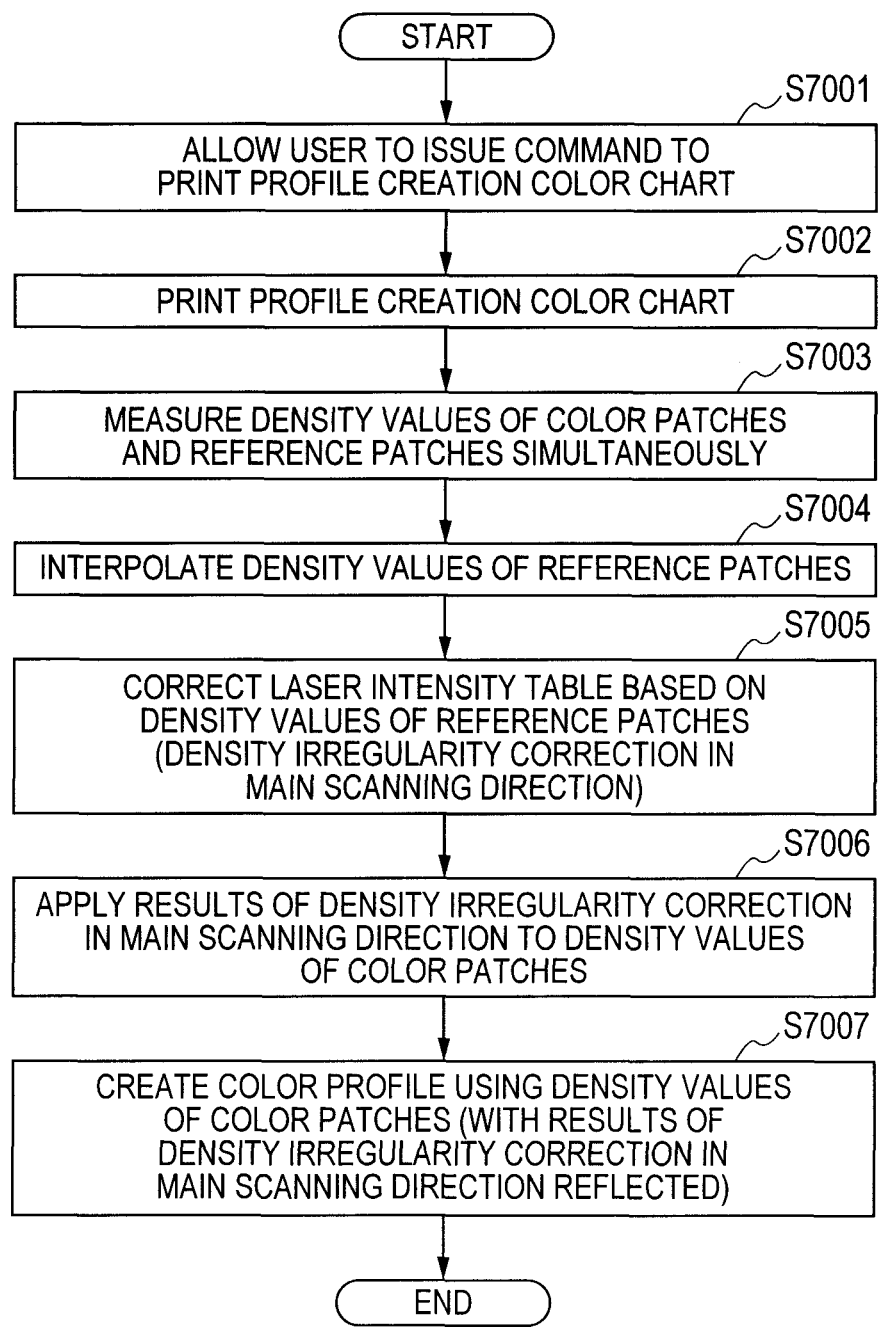
FIG. 7 is a flowchart showing a density tone correction process which takes density irregularities into consideration during measurement of a color chart for color profile creation, according to a third embodiment.
Figure 8:
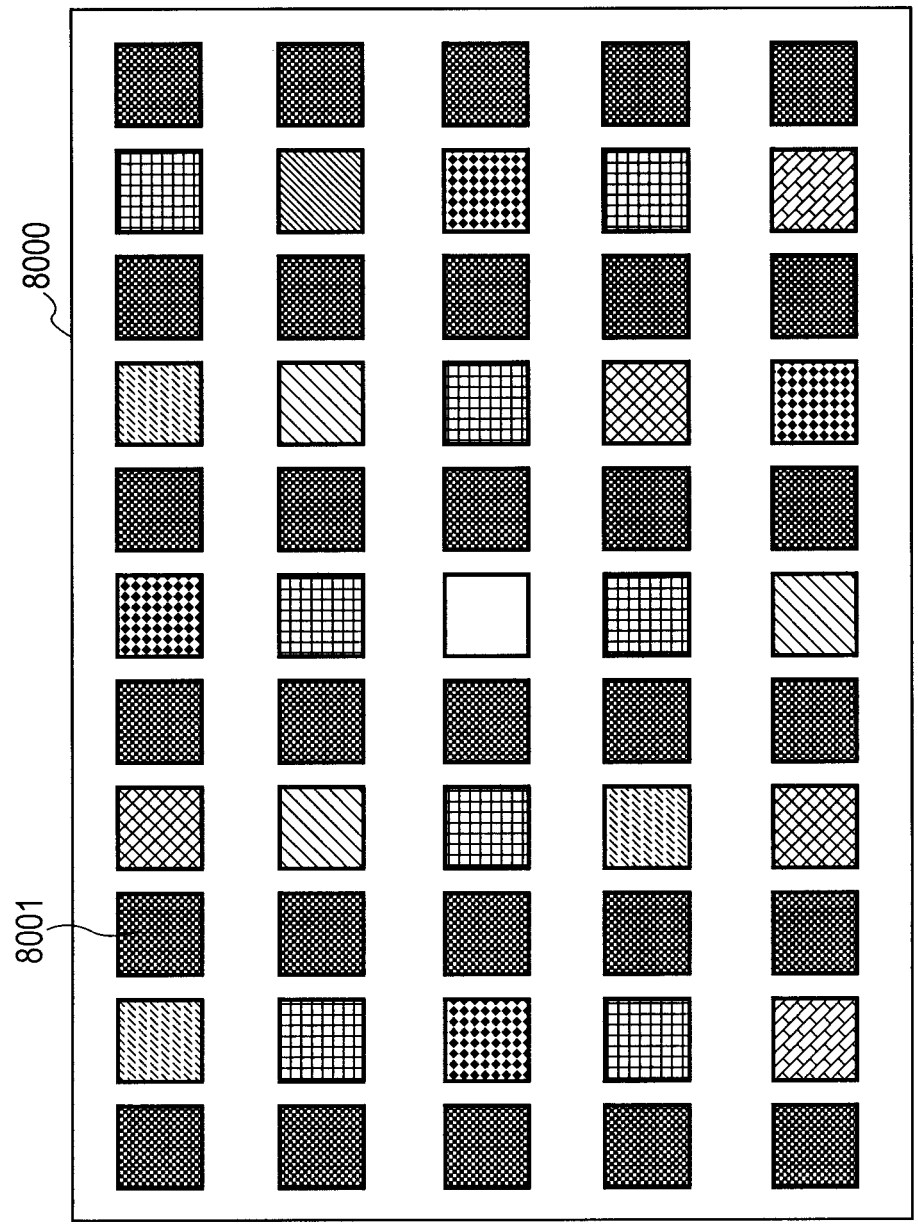
FIG. 8 is a diagram showing an example of an evaluation image used in the third embodiment.

Next, a process flow of an image processing apparatus according to a third embodiment will be described in detail with reference to a flowchart in FIG. 7 and an exemplary evaluation image in FIG. 8. In the third embodiment, density irregularity correction is performed during profile creation.

To create a color profile, the user starts profile creation software preinstalled on the host computer 103. Then, by following instructions on a UI of the profile creation software, the user issues a command to create an evaluation image (hereinafter referred to as a color chart) 8000 for profile creation (S7001). In response, the printer 203 prints the color chart (S7002).

Multiple color patches and multiple reference patches are placed alternately on the color chart. The multiple color patches are patches of various colors created by mixing multiple process colors (cyan, magenta, yellow, and black). Also, the multiple reference patches are created using the same density signal. For example, a reference patch 8001 in FIG. 8 is a gray patch of (C, M, Y, K)=(50, 50, 50, 50). However, this value is not restrictive and the density may be set to a value which will more readily reflect the density irregularities of the printing device 100.

Next, the user measures the printed color chart 8000 by following instructions on a UI of the profile creation software and using the reader 105 connected to the host computer 103 (S7003). Concrete operations are the same as the first embodiment, and thus detailed description thereof will be omitted.

Read data obtained by measurement is transmitted from the reader 105 to the control unit 205 of the image processing apparatus via the host computer 103. The control unit 205 processes the received read data as follows.

First, assuming that patches (virtual reference patches) exist at locations where actually no reference patch is placed, the control unit 205 estimates density values of the virtual reference patches by interpolation (S7004). Regarding the interpolation, the density values of the virtual reference patches may be found by linear interpolation using density values of known reference patches in the vicinity or may be found using other interpolation techniques. For example, the interpolation technique described in the first embodiment may be used.

Then, based on measured density values and interpolated density values of all the reference patches, the control unit 205 performs density irregularity correction in the main scanning direction (corrects the laser intensity table) (S7005). Concrete processes are the same as the first embodiment, and thus detailed description thereof will be omitted.

In S7006, the control unit 205 finds density variations by applying effects of the density irregularity correction in the main scanning direction to measured density values and interpolated density values of the color patches. As in the case of the first embodiment, the density variations are estimated using the amounts of laser intensity correction (FIG. 13) resulting from density irregularity correction, the measured density values of the color patches, and the color patch density variation estimation table (FIG. 14) already held by the image processing apparatus 1000.

Then, the control unit 205 establishes final measured density values by adding the estimated density variations to the measured density values of the color patches and transmits the final measured density values to the host computer 103. Then, the host computer 103 creates a profile from the final measured density values using normal procedures (S7007).

<Variation>

Figure 9:
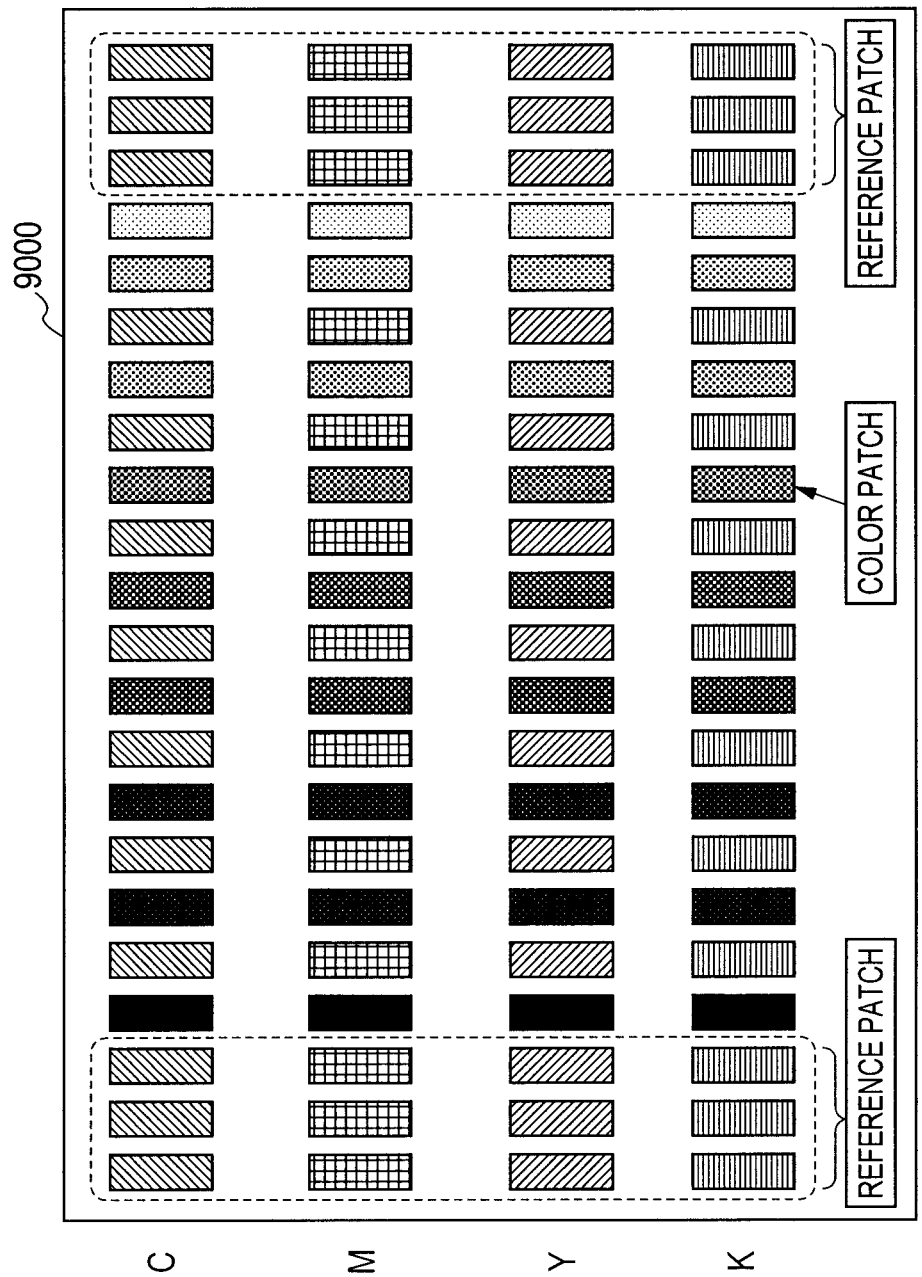
FIG. 9 is a diagram showing an example of an evaluation image in which reference patches are placed by taking into consideration printing characteristics of a printing device.

Although in the first to third embodiments, color patches and reference patches are placed alternately on the same main scanning line, this is not restrictive. For example, if the image processing apparatus used exhibits unstable density on opposite ends of a main scanning line, reference patches may be placed thickly at opposite ends of the evaluation image as illustrated by an evaluation image 9000 in FIG. 9.

Figure 10:
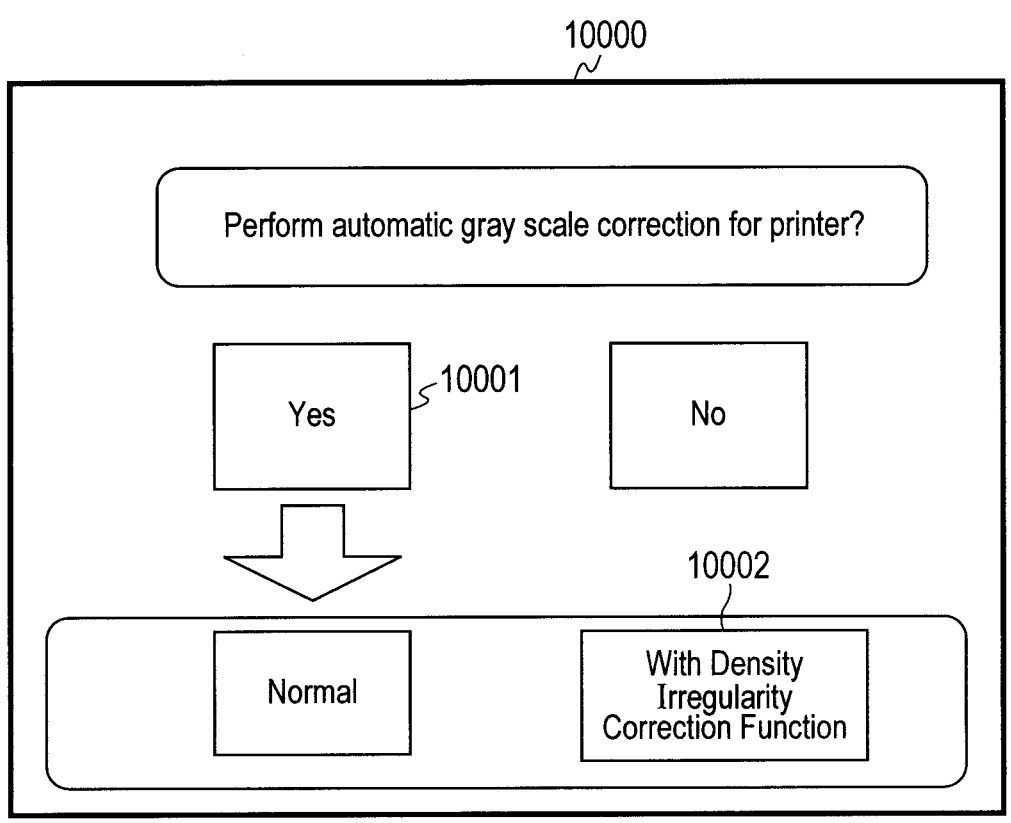
FIG. 10 is a diagram showing an example of a UI used to give a command to perform density tone correction.

Also, although in the first to third embodiments, a command to perform density tone correction is issued from the host computer 103, this is not restrictive. The command to perform density tone correction may be issued from the operating unit 204 of the image processing apparatus 1000 or any of the local PC 104a to 104c networked with the host computer 103. In either case, a screen similar to (or the same screen as) the density tone correction command screen 10000 in FIG. 10 is displayed.

Also, although in the first to third embodiments, the reader 105 is connected to the host computer 103, this is not restrictive. The reader 105 may be connected to the image processing apparatus 1000 or to any of the local PC 104a to 104c networked with the host computer 103. When the reader 105 is connected to the image processing apparatus 1000, read data is transmitted to the control unit 205 of the image processing apparatus via the external I/F 202. When the reader 105 is connected to any of the local PC 104a to 104c, the read data is transmitted to the control unit 205 of the image processing apparatus via the host computer 103 and external I/F 202.

Also, although in the first to third embodiments, density is measured using the reader 105 of an evaluation image, this is not restrictive and the density may be measured using a colorimeter or the scanner unit 201 of the image processing apparatus 1000. When the scanner unit 201 is used, the read data is transmitted from the scanner unit 201 to the control unit 205.

The embodiments described above allow density irregularities in the main scanning direction to be reflected in density tone correction with higher accuracy while reducing the load imposed on the user who needs to print and measure an evaluation image.

Other Embodiments

It should be understand that the present invention can also be implemented as follows. Specifically, software (programs) that implements the functions of the above embodiments can be supplied to a system or apparatus via a network or any of various storage media. Then, a computer (or a CPU or MPU) of the system or apparatus reads and executes the programs. In that case, the programs themselves and the storage medium which stores the programs will constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-008046, filed Jan. 18, 2010, which is hereby incorporated by reference herein in its entirety.

What is claimed is:

1. An image processing apparatus comprising:
a printing unit configured to print an evaluation image in which a plurality of color patches and a plurality of reference patches are placed on a same main scanning line;
a measuring unit configured to measure density of the evaluation image printed by the printing unit;
a first calculating unit configured to calculate densities of virtual reference patches at locations of the color patches on the main scanning line using the densities of the plurality of reference patches measured by the measuring unit;
a density irregularity correction unit configured to perform density irregularity correction in a main scanning direction using the densities of the plurality of reference patches measured by the measuring unit and the densities of the virtual reference patches calculated by the first calculating unit;
a second calculating unit configured to calculate densities of virtual color patches at locations of the reference patches on the main scanning line using the densities of the plurality of color patches measured by the measuring unit;
an obtaining unit configured to obtain density variations with respect to the densities of the plurality of color patches measured by the measuring unit and the densities of the virtual color patches calculated by the second calculating unit, the density variations arising due to the density irregularity correction performed by the density irregularity correction unit; and
a density tone correction unit configured to perform density tone correction using the density variations obtained by the obtaining unit and the densities of the plurality of color patches measured by the measuring unit.

2. The image processing apparatus according to claim 1, wherein the measuring unit comprises any one of a colorimeter, a densitometer and a scanner.

3. The image processing apparatus according to claim 1, wherein the first calculating unit or the second calculating unit calculates the densities of the virtual reference patches or the virtual color patches through interpolation using the densities of reference patches located in the vicinity of the virtual reference patches out of the plurality of reference patches.

4. The image processing apparatus according to claim 1, wherein the plurality of color patches are identical in process color, but different in density, the plurality of reference patches have the same process color as the color patches, and density irregularities in the main scanning direction are reflected in the plurality of reference patches.

5. The image processing apparatus according to claim 1, wherein the plurality of color patches are created by mixing multiple process colors, the plurality of reference patches are created using the same density signal as the color patches, and density irregularities in the main scanning direction are reflected in the plurality of reference patches.

6. An image processing method carried out in an image processing apparatus, the method comprising:
printing an evaluation image in which a plurality of color patches and a plurality of reference patches are placed on a same main scanning line;
measuring density of the printed evaluation image;
calculating densities of virtual reference patches at locations of the color patches on the main scanning line using the measured densities of the plurality of reference patches;
performing density irregularity correction in a main scanning direction using the measured densities of the plurality of reference patches and the calculated densities of the virtual reference patches;
calculating densities of virtual color patches at locations of the reference patches on the main scanning line using the measured densities of the plurality of color patches;
obtaining density variations with respect to the measured densities of the plurality of color patches and the calculated densities of the virtual color patches, the density variations arising due to performing the density irregularity correction; and
performing density tone correction using the obtained density variations and the measured densities of the plurality of color patches.

7. A non-transitory computer readable storage medium for storing a computer program that causes a computer to execute the method according to claim 6.

* * * * *